United States Patent [19]

Schumacher et al.

[11] Patent Number: 5,080,183

[45] Date of Patent: * Jan. 14, 1992

[54] SEAL ASSEMBLY FOR ROLLER CUTTER DRILL BIT HAVING A PRESSURE BALANCED LUBRICATION SYSTEM

[75] Inventors: Percy W. Schumacher; James C. Walter, both of Houston, Tex.

[73] Assignee: Camco International Inc.

[*] Notice: The portion of the term of this patent subsequent to Aug. 20, 2008 has been disclaimed.

[21] Appl. No.: 686,136

[22] Filed: Apr. 16, 1991

Related U.S. Application Data

[63] Continuation of Ser. No. 566,129, Aug. 13, 1990.

[51] Int. Cl.$^5$ .............................................. E21B 10/22
[52] U.S. Cl. ................................... 175/371; 175/228; 277/92; 384/94
[58] Field of Search ............... 175/371, 372, 228, 227; 277/92; 384/94

[56] References Cited

U.S. PATENT DOCUMENTS

| | | | |
|---|---|---|---|
| 3,180,648 | 4/1965 | Kupfert et al. | 277/95 X |
| 3,216,513 | 11/1965 | Robbins et al. | 175/372 X |
| 3,550,972 | 12/1970 | Coski | 384/94 X |
| 4,176,848 | 12/1979 | Lafuze | 277/92 |
| 4,249,622 | 2/1981 | Dysart | 175/372 X |
| 4,466,622 | 8/1984 | Deane et al. | 175/371 X |
| 4,494,749 | 1/1985 | Evans | 277/22 |
| 4,509,607 | 4/1985 | Saxman et al. | 175/371 X |
| 4,516,641 | 5/1985 | Burr | 175/372 X |
| 4,838,365 | 6/1989 | Kotch | 175/371 |

Primary Examiner—Hoang C. Dang
Attorney, Agent, or Firm—Dodge, Bush, Moseley & Riddle

[57] ABSTRACT

A seal assembly (46) for a rotary drill bit (10) having a pressure balanced lubrication system is mounted in a pocket (48) between a journal (16) and a roller cutter (18). The seal assembly (46) has a pair of rigid seal rings (50, 52) in sliding sealing contact with each other and a pair of elastomeric seal rings (54, 56) in side by side relation sealing against the inner peripheral surfaces (62, 64) of the rigid seal rings (50, 52) for continuously urging the sealing faces (58, 60) of the rigid seal rings (50, 52) into sliding sealing contact. The pressure balanced lubrication system has a pressure compensating diaphragm (38) and lubricant passages (40, 42, 44) extending directly from the lubricant reservoir (35) to the lubricant chamber (48A) in the pocket (48) for minimizing fluid pressure differentials between the lubricant chamber (48A) and the drilling fluid chamber (48B). Drilling fluid in the drilling fluid chamber (48B) acts against the rear faces (63, 65) of the metal seal rings (50, 52) to hold the sealing faces (58, 60) in sliding sealing contact.

13 Claims, 4 Drawing Sheets

SEAL ASSEMBLY FOR ROLLER CUTTER DRILL BIT HAVING A PRESSURE BALANCED LUBRICATION SYSTEM

This application is a continuation application of application Ser. No. 566,129 filed Aug. 13, 1990.

BACKGROUND OF THE INVENTION:

This invention relates to a seal assembly for a roller cutter drill bit having a pressure balanced lubrication system, and more particularly to a seal assembly between a journal on the bit body and a roller cutter mounted for rotation on the journal.

Heretofore, seal assemblies in a rotary drill bit between the journal and roller cutter mounted thereon for rotation have included a pair of metal seal rings urged into face to face sealing contact by a pair of elastomeric seal rings which seal against the metal seal rings in addition to forcing the metal seal rings into sealing contact. Normally one of the metal rings and elastomeric rings rotates with the cutter and the other metal ring is held in a static or non-rotating position on the journal by the other elastomeric ring. Thus, sliding sealing contact is normally provided between the metal contacting faces of the opposed metal seal rings. The use of a pair of elastomeric rings permits the metal seal rings to float back and forth and move together with little chance of being separated by the severe vibrations encountered in drill bits while drilling. Any separation of the metal sealing faces permits leakage of either the drilling fluid into the bearing areas between the journal and roller cutter, or leakage of lubricant outside the bearing areas.

Metal face seals with two metal seal rings and two rings have been used for years with success to seal bearings that must operate in an abrasive environment such as, for example, track rollers for treads on tractors, such as disclosed in U.S. Pat. No. 3,180,648. A similar type of seal is also disclosed in U.S. Pat. No. 3,216,513 for use in rolling cutter assemblies for large diameter bits for mining operations such as tunneling or drilling vent shafts for mines. These seals have heretofore provided both elastomeric seal rings on the same peripheral outer surface of the metal seal rings. These mining type applications have little or no borehole pressure and consequently do not require a hydrostatic pressure compensator as used in most downhole drill bits used in oil wells. The use of a seal such as shown in U.S. Pat. No. 3,216,513 in drill bits for oil wells could have severe problems due to pressure fluctuations across the seal caused by rapid excursions of the rolling cutter on the bearing journal as the bit drills and resulting in fluid pressure differentials between lubricant inside the bit and drilling fluid outside the bit. Because both elastomeric seal rings are located on the outer peripheral surfaces of the metal rings, resulting pressure differentials could cause leakage of mud contaminants into the bearing area because the seal contact pressure of the metal rings decreases as the mud pressure becomes greater than the lubricant pressure.

A metal face seal assembly as disclosed in U.S. Pat. No. 4,516,641 dated May 14, 1985 for drill bits helps compensate for these pressure fluctuations across the seal assembly caused by axial movements of the cutter by floating movement of the rigid rings in the seal cavity to balance the lubricant volume in the space between the seal and the main bearing. As disclosed in this patent the ratio of rigid ring movement to cutter movement in an axial direction was determined to be as much as 1.88 to 1 in order to balance the lubricant in this space. This still can cause a significant pressure differential across the seal assembly as one elastomeric ring is forced to compress more while the other elastomeric ring compresses less. The reduced compression of one of the elastomeric rings also can cause the associated rigid ring to slip resulting in wear of the elastomeric seal from frictional contact with the associated metal seal. Likewise, as shown in U.S. Pat. No. 4,466,622 dated Aug. 21, 1984, a metal face seal assembly is shown including a pair of metal seal rings and a pair of associated elastomeric rings, and particularly upon movement of the roller cutter to its outermost axial position on the journal, one of the elastomeric rings has more compression than the other elastomeric ring which could result in slippage and wear of one of the elastomeric rings ultimately causing seal failure.

One of the problems involved in the wear or deterioration of bearing areas or bearing surfaces between the journal and roller cutter is the problem of the egress or entering of drilling fluid into the bearing areas. The drilling fluid normally has foreign matter or contaminates entrained therein which can be damaging to the bearing areas. In seal assemblies heretofore for roller cutter drill bits used in oil wells and requiring a hydrostatic pressure compensator which includes a pair of metal seal rings urged into face to face sealing contact by a pair of elastomeric seal rings, the elastomeric seal rings have been provided on different peripheral surfaces of the metal seal rings, i.e. one elastomeric seal has been provided on the outer peripheral surface of one metal seal ring and the other elastomeric seal has been provided on the inner peripheral surface of the other metal seal ring. Normally one elastomeric seal ring is positioned on the outer peripheral surface of the dynamic metal seal ring which rotates with the cutter while the other elastomeric seal ring is positioned on the inner peripheral surface of the static metal seal adjacent the journal as shown in the aforesaid U.S. Pat. Nos. 4,466,622 and 4,516,641. However, under certain conditions of operation, such as an axial movement of the cutter from an innermost position on the journal to the outermost position on the journal, a maximum fluid pressure differential results from the drilling fluid along with a loss of compression in one of the elastomeric rings and possible slippage and wear of that elastomeric ring. Also, a rapid back and forth movement of the seal assembly in the cavity as the cutter moves back and forth may cause violent excursions of the seal assembly from severe vibrations of the bit while drilling.

BRIEF DESCRIPTION OF THE INVENTION

The present invention provides in a drill bit having a hydrostatic pressure compensator in a pressure balanced lubrication system, a rigid preferably metal face seal assembly that moves axially only a small amount, about ½ the axial movement of the roller cutter on the journal, while minimizing the dynamic differential pressures across the seal assembly caused by axial movement of the cutter in addition to preventing any leakage of contaminants into the bearings caused by differential pressures across the seal assembly.

The preferred embodiment of the seal assembly includes a pair of rigid rings in opposed face to face contact and urged into sliding sealing contact by a pair of associated elastomeric rings located in side by side relation on adjacent inner peripheral surfaces of the rigid rings and as a result the axial seal movement is only ½ the cutter axial movement on the journal to minimize dynamic movement, leakage, and possible wear of the elastomeric rings. Since the elastomeric rings are positioned in side by side relation on the inner peripheral surfaces of the rigid rings, leakage of contaminants into the bearings is minimized. In another embodiment the main bearing is allowed to occupy some of the same axial space as the seal assembly since the elastomeric seal rings are positioned in side by side relation on the inner peripheral surfaces of the rigid rings. This side by side relation allows the length of the adjacent main bearing area between the journal and cutter to be increased by occupying some of the same axial space as occupied by the seal assembly.

As a result of the arrangement in which a pair of elastomeric seal rings are positioned in side by side relation in sealing contact with the inner peripheral surfaces of a pair of metal seal rings in face to face sealing contact, the rear faces of both metal seal rings are exposed to drilling fluid. Upon a fluid pressure differential provided by rapid axial movement of the roller cutter from an innermost axial position on the journal to an outermost axial position, the drilling fluid urges both metal sealing faces toward each other to maintain the sealing faces in sealing contact even upon a loss of compression in the elastomeric rings thereby to prevent the leakage of drilling fluid with possible contaminants into the bearing areas between the roller cutter and journal. Thus, the greater the fluid pressure differential from the drilling fluid to the bearing space adjacent the seal assembly, the greater the sealing force urging the contacting metal sealing faces of the metal seal rings into sealing metal to metal contact.

It is noted that the pressure of the drilling fluid adjacent the seal assembly does not change substantially as the roller cutter moves axially back and forth on the journal or wobbles while the fluid pressure of the lubricant may increase substantially with an inward axial movement toward the journal and may decrease substantially with an outward axial movement away from the journal. A rapid increase in lubricant pressure can result from a rapid inward axial movement of the cutter from an outermost axial position due to a reduction in the volume of the lubricant chamber and it is desirable to minimize the pressure differential between the drilling fluid and lubricant so that leakage of lubricant between the metal sealing faces of the metal seal rings is prevented or minimized. For this purpose, a preferred embodiment of the present invention provides a lubricant channel of a relatively large cross sectional area from the pocket for the seal assembly to the fluid pressure compensator or diaphragm in the lubricant reservoir. Thus, the fluid pressure compensator responds to effect equalization of the fluid pressure differential between the drilling fluid and the lubricant.

It is an object of the present invention to provide a seal assembly for a roller cutter drill bit having a pressure balanced lubrication system with a pair of rigid seal rings urged into face to face sealing contact by a pair of elastomeric rings positioned in side by side relation in such a manner that the rear faces of both rigid seal rings are simultaneously exposed to drilling fluid for urging both rigid rings into face to face sealing contact thereby preventing leakage of drilling fluid therebetween within the bearing areas between the roller cutter and journal.

It is a further object of this invention to provide a floating seal assembly for a roller cutter drill bit having a pressure balanced lubrication system in which both elastomeric seals are arranged in side by side relation on adjacent peripheral surfaces of the rigid rings to permit minimal floating movement of the seal assembly and elastomeric rings upon axial back and forth movement of the roller cutter on the journal thereby to minimize wear of the elastomeric seals.

It is a further object of the present invention to provide such a floating seal assembly for a roller cutter drill bit having a pressure balanced lubrication system with the lubrication system including a lubricant reservoir and fluid pressure compensator therein with changes in the lubricant fluid pressure being rapidly communicated to the fluid pressure compensator in the reservoir thereby resulting in a rapid equalization of the fluid pressure differential between the lubricant and drilling fluid for minimizing leakage of lubricant between the opposed contacting faces of the rigid seal rings particularly when a maximum increase in lubricant fluid pressure occurs.

Another object is to provide such a floating seal assembly for a roller cutter drill bit in which the length of the main bearing area between the roller cutter and journal is increased by occupying the same axial length on the cutter as the seal assembly.

Other objects, features, and advantages of this invention will become more apparent after referring to the following specification and drawings.

Figure 1:
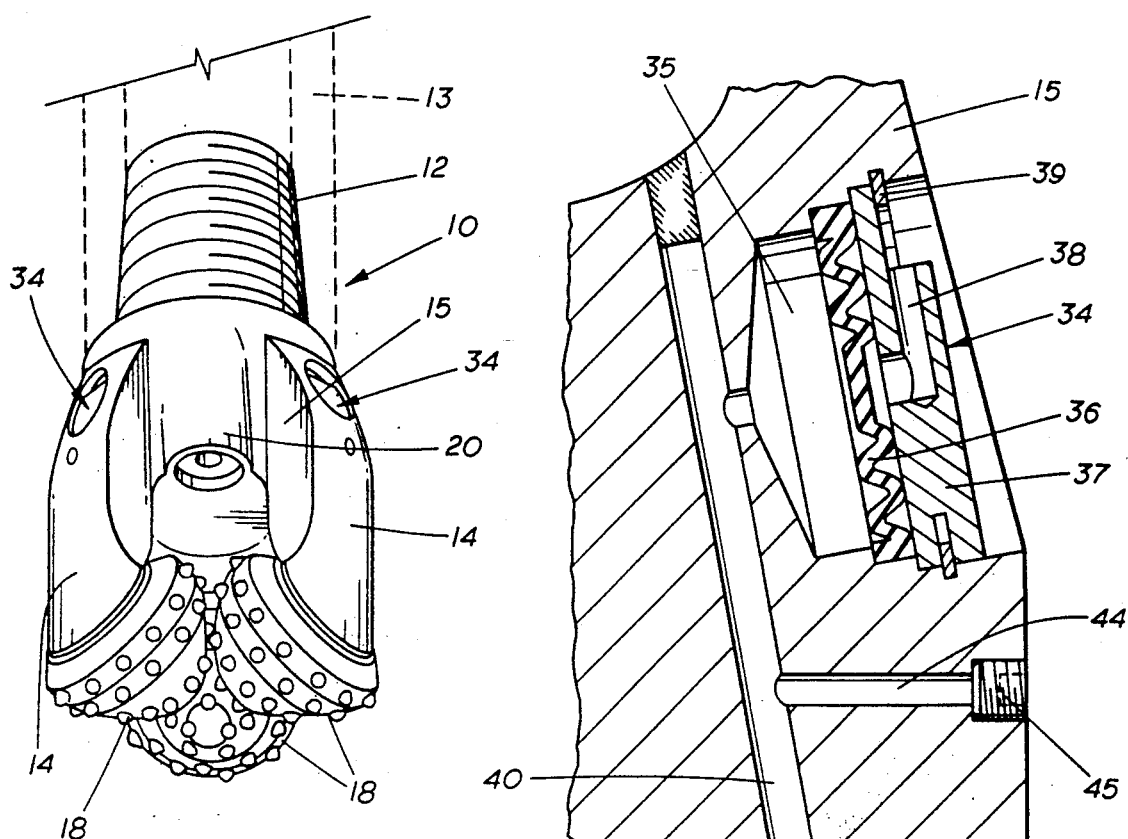
FIG. 1 is an elevation of a rotary drill bit showing a plurality of cutters mounted for rotation on the journal of the drill bit.
Figure 2:
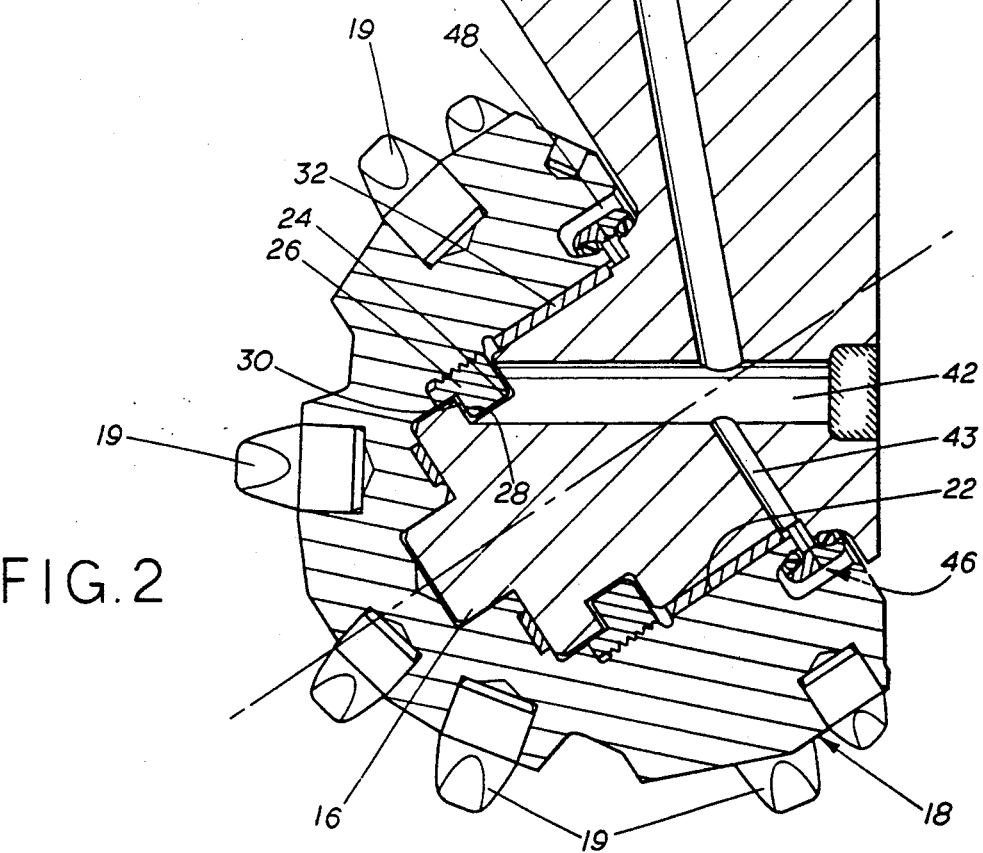
FIG. 2 is a partial longitudinal section view illustrating the mounting of a roller cutter on a journal of a lug forming a segment of the bit body and showing a pressure balanced lubrication system including pressure compensating means for balancing fluid pressure between the lubricant and the drilling fluid.

Referring now to the drawings for a better understanding of the invention and more particularly to FIG. 1 and 2, a typical rotary drill bit is illustrated generally at 10 having a threaded upper end at 12 which may be connected to the lower end of a drill string illustrated generally at 13 for drilling an oil well or the like. Rotary drill bit 10 is normally formed of three elongated body sections or lugs indicated at 14 which are welded together to form a completed bit body 15. Each body section or lug 14 has a generally cylindrical bearing journal 16 on an extending end thereof and a roller cutter 18 is mounted thereon for rotation. Roller cutter 18 has cutting teeth thereon for engaging in cutting relation a formation to be drilled. Drilling fluid for drill string 13 is supplied through suitable nozzles 20 to aid in the cutting operation as well known in the art.

Each roller cutter 18 has an internal bore 22 to receive bearing journal 16 thereon. Journal 16 has an annular groove 24 therein and an externally threaded retainer ring 26 threaded onto roller cutter 18 is received within groove 24 for retaining cutter 18 onto journal 16. Opposed bearing surfaces 28 and 30 are provided on journal 16 and retainer ring 26. A bushing or bearing sleeve 32 is provided for the main bearing surfaces of roller cutter 18 and journal 16 and is received within the large diameter portion of internal bore 22.

A lubrication system is designated generally at 34 in body 15 and includes a lubricant reservoir 35 closed by a pressure compensating diaphragm 36 for effecting a balance of fluid pressure between the drilling fluid outside bit 10 and lubricant inside bit 10. A cap 37 has a passage 38 for drilling fluid and is held in position against diaphragm 36 by split ring 39. A main lubricant passage 40 extends from reservoir 35 and branch passages 42, 43, extend from main passage 40 to the bearing and sealing surfaces. A lubricant supply passage 44 has a threaded end plug 45 adapted for removal to supply lubricant to reservoir 35.

Figure 3:
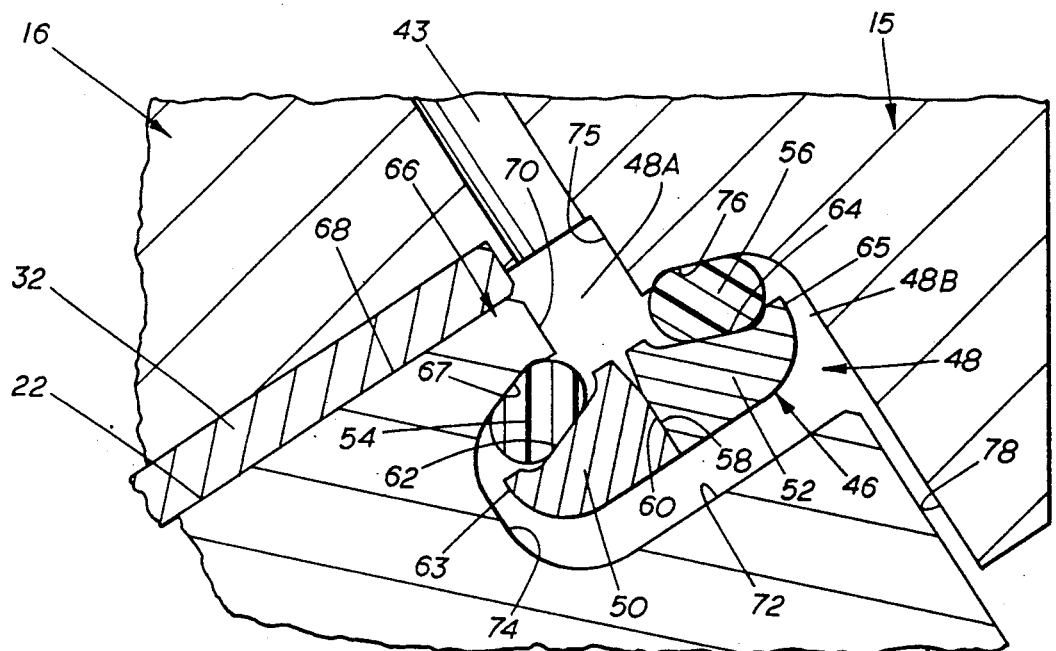
FIG. 3 is an enlarged fragment of FIG. 2 illustrating the seal assembly forming the present invention mounted in an annular pocket or space between the roller cutter and the journal with the seal assembly shown in an intermediate position.
Figure 4:
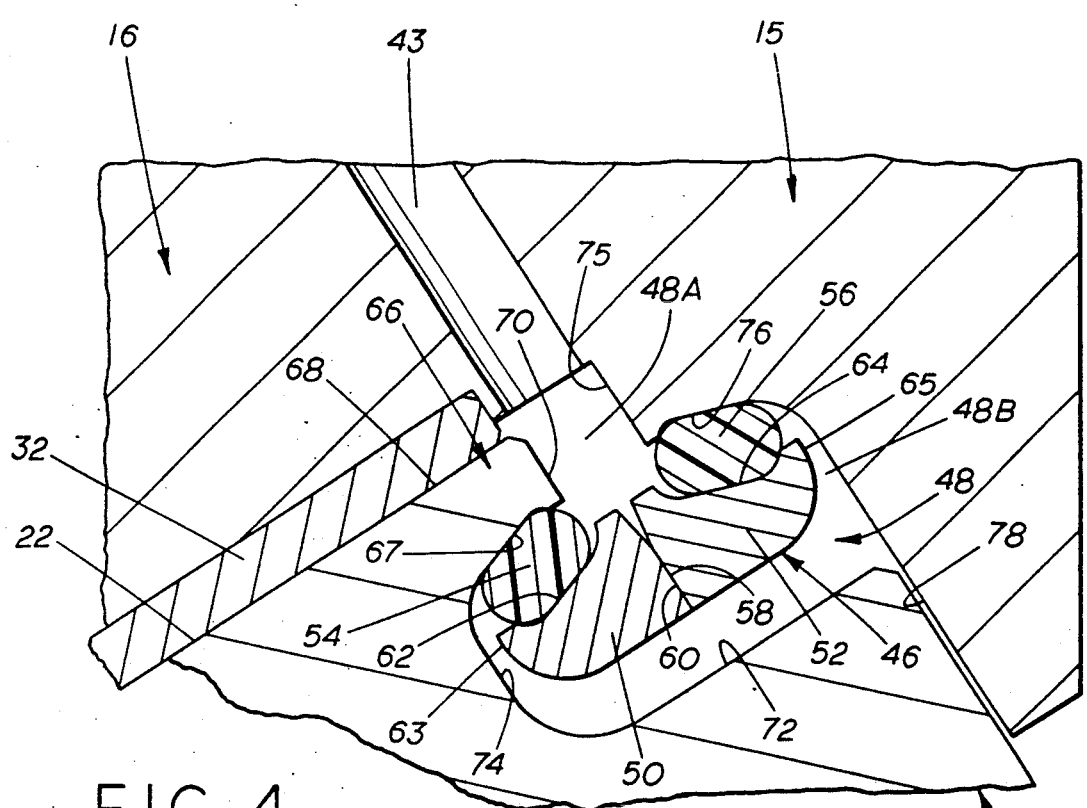
FIG. 4 is an enlarged section of the seal assembly similar to FIG. 3 but showing the roller cutter and seal assembly in an innermost axial position on the journal and toward the bit body.
Figure 5:
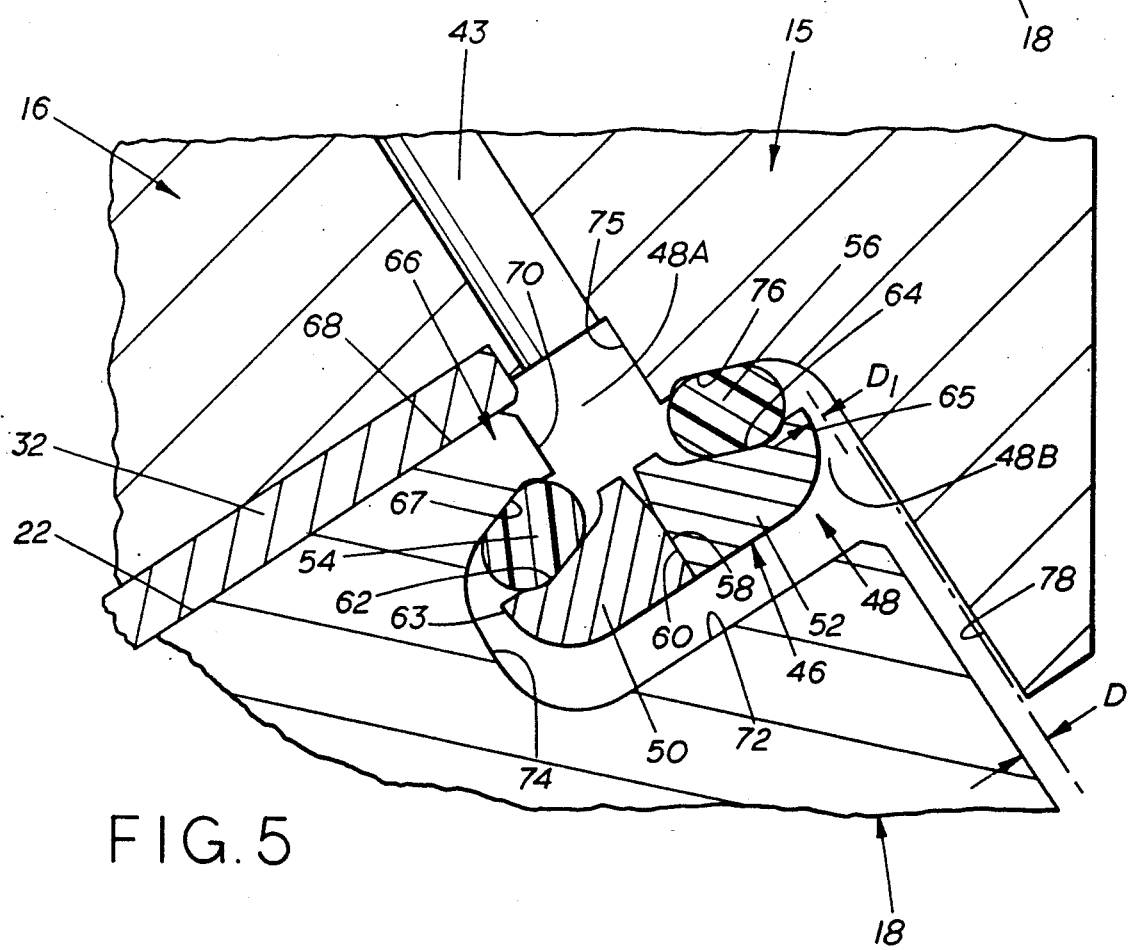
FIG. 5 is an enlarged section of the seal assembly similar to FIG. 3 but showing the roller cutter and seal assembly in an outermost axial position on the journal away from the bit body.

A sealing assembly generally indicated at 46 forms an important feature of this invention and is shown particularly in FIGS. 3-5. Sealing assembly 46 is received for floating back and forth movement within an annular pocket or space shown at 48 formed between journal 16 and cutter 18 at the juncture of journal 16 with lug 14. Sealing assembly 46 blocks outward flow of lubricant past the bearing surfaces outside bit body 15 and inward flow of drilling fluid with any entrained contaminants or foreign matter inside bit body 15 to the bearing surfaces.

Seal assembly 46 includes a pair of opposed rigid seal rings 50, 52 and a pair of associated elastomeric seal rings 54, 56. Rigid seal rings 50, 52 have contacting metal seal faces 58, 60 with rigid ring 50 rotating with roller cutter 18 and sealed by elastomeric seal ring 54 to cutter 18. Metal ring 52 is held in position and statically sealed by elastomeric ring 56 to journal 16. Elastomeric seal rings 54, 56 engage the inner peripheral or circumferential surfaces 62, 64 of respective rigid seal rings 50, 52 to urge faces 58, 60 into sealing contact with each other. The entire rear faces or surfaces 63, 65 of rigid seal rings 50, 52 are continuously exposed to drilling fluid for urging sealing faces 58, 60 into sealing relation. Thus when the drilling fluid pressure becomes higher than the lubricant pressure the differential pressure causes sealing faces 58, 60 to be urged together even tighter thus preventing leakage of drilling fluid between sealing faces 58, 60.

A lip 66 on cutter 18 has an outer peripheral surface 67, an inner peripheral surface 68 in contact with bearing sleeve 32 forming a smooth continuation of internal bore 22, and a planar tip or end surface 70 extending in a transverse direction between surfaces 67 and 68. Cutter 18 further defines an annular surface 72 and an end surface 74 connecting surfaces 67 and 72. Journal 16 defines an annular shoulder or abutment at 75 in spaced opposed relation to end surface 70 of lip 66 and a planar annular end surface 78 is provided on lug 14 adjacent journal 14 at the juncture of journal 16 with lug 14. A circumferential surface 76 at the base of journal 16 connects shoulder 75 and planar surface 78. Elastomeric seal ring 54 is compressed between opposed surfaces 62 and 67, and elastomeric seal ring 56 is compressed between opposed surfaces 64 and 76.

FIG. 3 shows seal assembly 46 in an intermediate position with elastomeric seals 54, 56 under a predetermined precompression. FIG. 4 shows roller cutter 18 and seal assembly 46 in an innermost position on journal 16 upon inward axial movement of cutter 18 toward bit body 15 with lubricant fluid pressure increased and elastomeric rings 54, 56 compressed the maximum amount. FIG. 5 shows roller cutter 18 and seal assembly 46 in an outermost position on journal 16 upon outward axial movement of cutter 18 away from bit body 15 with lubricant pressure decreased and drilling fluid acting against elastomeric rings 54, 56 and the entire end faces 63, 65 of rigid seal rings 50, 52 to prevent drilling fluid from entering the bearing system between contacting faces 58, 60. Elastomeric seal rings 54, 56 separate pocket 48 into two chambers 48A and 48B. Chamber 48A is filled with lubricant defining a lubricant chamber while chamber 48B is filled with drilling fluid defining a drilling fluid chamber. The volume and cross sectional area of lubricant chamber 48A is at a minimum as shown in FIG. 4. Thus when the cutter 18 moves inward toward the bit body and attains its highest velocity the maximum lubricant pressure with respect to drilling fluid pressure results. This is true because while the drilling fluid in the drilling fluid chamber can escape to the outside of the bit through the relatively large clearance gap D, the lubricant in the lubricant chamber must escape through the relatively small passageways 43 and 40 to pressure compensator reservoir 35 and diaphragm 36.

Roller cutter 18 continuously reciprocates between the positions of FIGS. 4 and 5 resulting in a continuous pressure differential between the lubricant and drilling fluid in pocket 48 on opposite sides of floating seal assembly 46. The faster the axial movement of cutter 18 the greater the fluid pressure differential since the fluid pressure differential is controlled primarily by the axial velocity of cutter 18 moving back and forth on journal 16. It is important that such a differential fluid pressure be minimized particularly upon a rapid increase in lubricant pressure so that lubricant does not leak past the sealing faces 58 and 60. For this purpose, a direct lubricant channel of a relatively large cross section is provided between chamber 48A and lubricant reservoir 35 by lubricant passages 40 and 43 which are preferably of a minimal size of at least around 3/16 inch in diameter. Thus, a minimal pressure differential between lubricant chamber 48A and drilling fluid chamber 48B is realized, thereby to minimize possible leakage of fluids past sealing faces 58, 60 of rigid seal rings 50, 52.

It is desirable that the maximum axial movement of roller cutter 18 which is illustrated at D in FIG. 5 be at a minimum with such axial movement no greater than around 0.015 inch. The amount and velocity of axial movement of cutter 18 on journal 16 would vary dependent on such factors as the diameters of cutter 18 and journal 16, the rotational speed of cutter 18, the cutter design and the type of formation. However, as shown in FIG. 5 the movement of seal assembly 46 with respect to journal 16 and cutter 18 is shown as D1 with D1 being only ½ of travel distance D of roller cutter 18. Rigid seal ring 52 moves a distance D1 and rigid seal ring 50 likewise moves a distance D1 from the innermost position shown in FIG. 4. Elastomeric seal rings 54, 56 since positioned about a similar peripheral surface of rigid rings 50, 52 are compressed simultaneously substantially the same amount from opposed directions by the drilling fluid as shown in FIG. 5 or compressed simultaneously from opposed directions from the lubricant as shown in FIG. 4. Thus, wear and resulting deterioration of elastomeric rings 54, 56 is minimized from the positioning of elastomeric seal rings 54, 56 in side by side relation on the same peripheral surfaces of rigid rings 50, 52. Elastomeric rings 54, 56 are installed under a sufficient compression to maintain sealing relation against contacting surfaces in the positions of FIGS. 4 and 5.

It is desirable to provide a maximum journal length for distributing the bearing loads exerted between journal 16 and cutter 18. The inner peripheral surface 68 of projecting lip 66 is a continuation of the surface defining the large diameter bore portion of internal bore 22 and provides a bearing surface for bushing 32 thereby permitting a long length bearing area or surface for journal 16.

Figure 6:
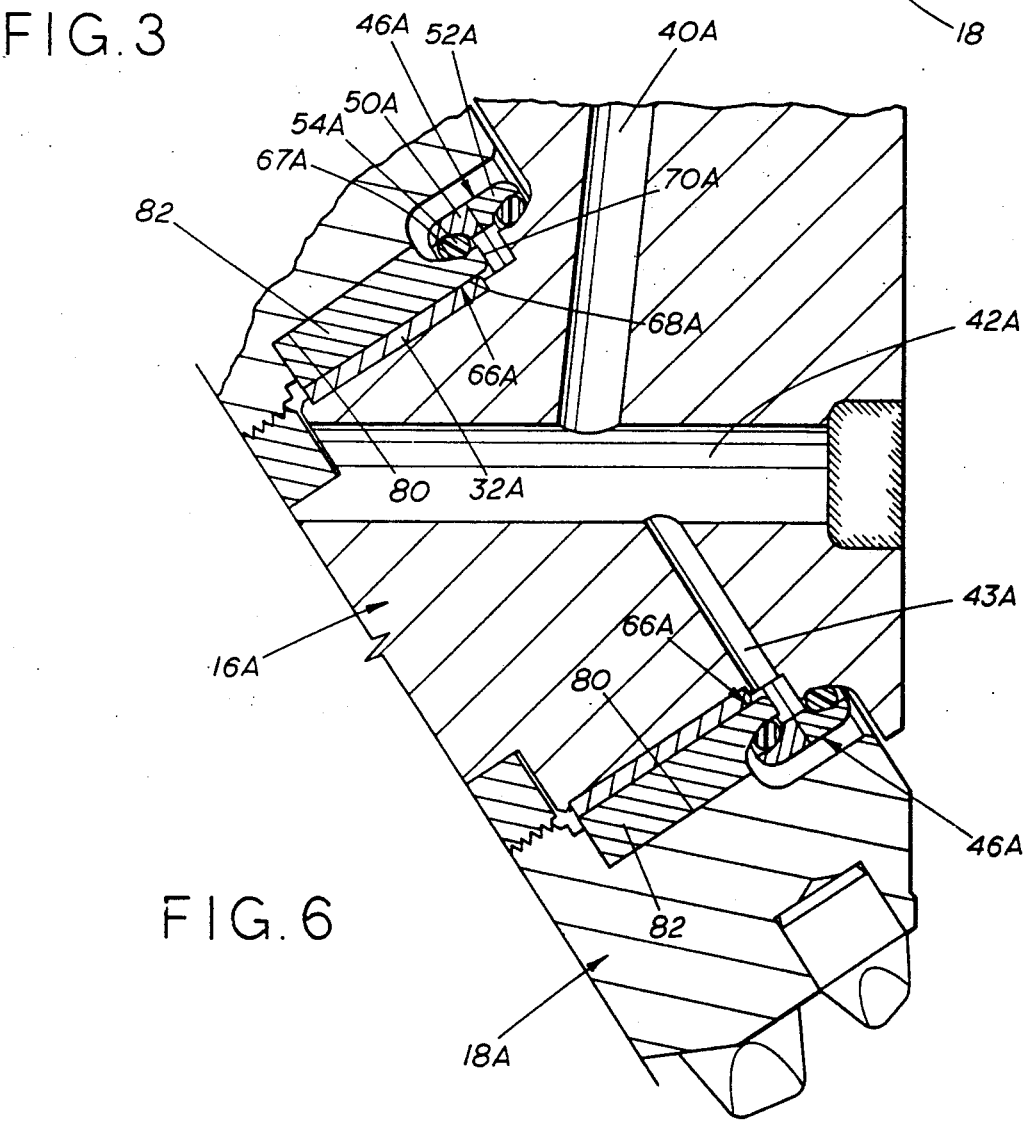
FIG. 6 is a sectional view of a modified roller cutter in which an internal sleeve is secured to the roller cutter and forms a portion of the pocket receiving the seal assembly.

Referring now to FIG. 6, a modified roller cutter 18A is shown mounted on journal 16A with lubricant passages 40A, 43A leading to seal assembly 46A. A counterbore 80 in the internal cavity of cutter 18A has a sleeve 82 pressed fitted therein for positioning adjacent bushing 32A. Sleeve 82 is formed with a lip 66A defining peripheral surfaces 67A and 68A connected by end surface or tip 70A. Elastomeric seal ring 54A is compressed between rigid seal ring 50A and lip 66A. Sleeve 82 may be formed of a material different from cutter 18A and preferable of a material compatible with floating bushing 32A such as a carburized steel material to provide a hardened surface for contacting floating sleeve 32A. Seal assembly 46A functions in a manner identical to seal assembly 46.

Figure 7:
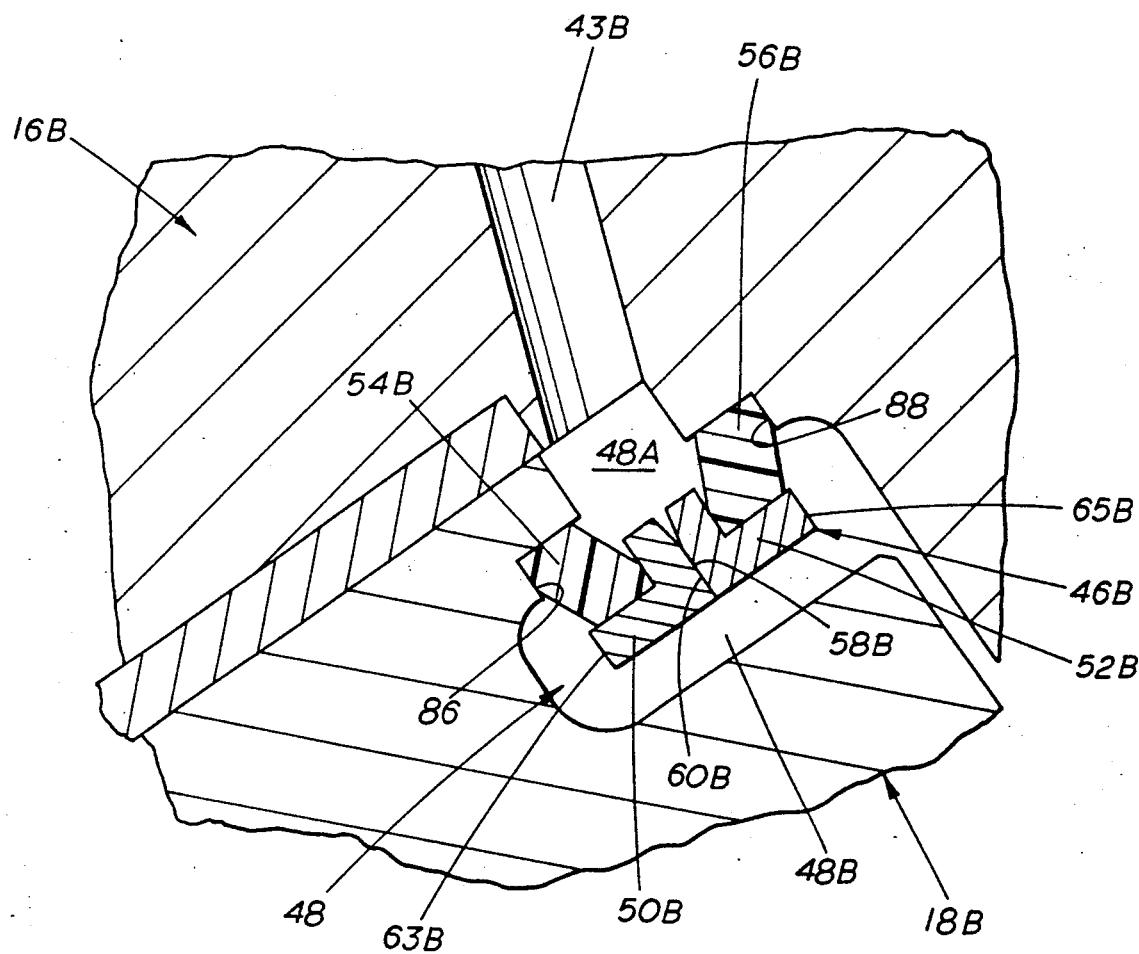
FIG. 7 is an enlarged sectional view of a modified seal assembly in which a pair of elastomeric seal rings are arranged in side by side relation and are compressed in shear upon axial movement of the roller cutter.

Referring now to FIG. 7, a modified seal assembly 46B is illustrated mounted in pocket 48 formed between journal 16B and roller cutter 18B. Lubricant passage 43B provides lubricant to lubricant chamber 48A and drilling fluid chamber 48B is supplied with drilling fluid outside the bit. Seal assembly 46B includes a pair of L-shaped metal seal rings 50B and 52B having sealing faces 58B and 60B urged into sealing contact with each other by elastomeric seal rings 54B and 56B. Elastomeric seal ring 54B is wedged between shoulder 86 on cutter 18B and L-shaped metal ring 50B while elastomeric seal ring 56B is wedged between shoulder 88 on journal 16B and metal ring 52B. Thus, elastomeric rings 54B and 56B are compressed in shear upon axial back and forth movement of roller cutter 18B on journal 16B. Rear faces 63B and 65B of metal rings 50B and 52B are continuously exposed to drilling fluid from drilling fluid chamber 48B. Seal assembly 46B functions in a manner similar to seal assembly 46 except for the compression of elastomeric rings 54B and 56B.

While preferred embodiments of the present invention have been illustrated in detail, it is apparent that modifications and adaptations of the preferred embodiments will occur to those skilled in the art. However, it is to be expressly understood that such modifications and adaptations are within the spirit and scope of the present invention as set forth in the following claims.

What is claimed is:

1. A rotary drill bit comprising:
    a bit body having a journal extending therefrom and a roller cutter mounted for rotation on said journal, said journal forming a first bearing member and said roller cutter forming a second bearing member;
    an annular pocket formed between said journal and roller cutter generally at the juncture of said journal and bit body; and
    a seal assembly mounted within said pocket for sealing between said journal and said roller cutter, said seal assembly including a pair of rigid seal rings in said pocket in face to face sealing contact with each other and having inner peripheral surfaces, and a pair of resilient seal rings in sealing contact with said inner peripheral surfaces of said rigid seal rings and continuously urging said rigid seal rings into face to face sealing contact, one of said resilient seal rings being positioned between the inner peripheral surface of one rigid seal ring and said journal, and the other of said resilient seal rings being positioned between the inner peripheral surface of the other rigid seal ring and said roller cutter.

2. A rotary drill bit as set forth in claim 1 wherein said rigid seal rings are metal and have front faces in metal to metal sealing contact with each other.

3. A rotary drill bit as set forth in claim 1 wherein said resilient seal rings comprise a pair of adjacent elastomeric seal rings.

4. A rotary drill bit as set forth in claim 1 wherein a lip on said roller cutter has an outer peripheral surface defining a portion of said annular pocket.

5. A rotary drill bit as set forth in claim 4 wherein said lip has an inner peripheral surface defining a bearing surface for said roller cutter.

6. A rotary drill bit comprising:
    a bit body having a journal extending therefrom and a roller cutter mounted for rotation on said journal, said journal forming a first bearing member and said roller cutter forming a second bearing member;
    an annular pocket formed between said journal and roller cutter generally at the juncture of said journal and bit body;
    a lubricant system including a lubricant reservoir in said bit body, fluid pressure compensating means in said reservoir for effecting a balancing of fluid pressure between drilling fluid outside the bit and lubricant inside the bit, and lubricant passages between said lubricant reservoir and said pocket for providing lubricant thereto; and
    a seal assembly mounted within said pocket for sealing between said journal and said roller cutter, said assembly including a pair of rigid seal rings in said pocket in face to face sealing contact with each other and having inner peripheral surfaces, and a pair of resilient seal rings in sealing contact with said inner peripheral surfaces of said rigid seal rings and continuously urging said rigid seal rings into face to face sealing contact, said resilient seal rings separating said pocket into a lubricant chamber and a drilling fluid chamber;
    said lubricant passages to said lubricant chamber pocket being of sufficient cross sectional area to maintain the fluid pressure differential between the drilling fluid pressure outside the bit and the lubricant pressure inside the bit at a minimal amount sufficient to insure that said rigid seal rings are in sliding sealing contact with each other during operation of the drill bit.

7. A rotary drill bit as set forth in claim 6 wherein said resilient seal rings comprise a pair of adjacent elastomeric seal rings.

8. A rotary drill bit as set forth in claim 6 wherein said rigid seal rings are metal and have front faces in metal to metal sealing contact with each other.

9. A rotary drill bit as set forth in claim 6 wherein said rigid seal rings have front faces in sealing contact with each other and opposed rear faces spaced from said front faces, said rear faces being in said drilling fluid chamber and exposed to drilling fluid for continuously urging said front faces together in sealing relation, the sealing force against said rigid rings resulting from the pressure of said drilling fluid in said drilling fluid chamber being higher than the lubricant fluid pressure in said lubricant chamber and increasing upon an increase in drilling fluid pressure.

10. A rotary drill bit as set forth in claim 6 wherein said roller cutter has an internal bore defining a large diameter bore portion and has a lip forming an inner peripheral surface providing a continuation of said large diameter bore portion in said cutter for receiving said journal, said inner peripheral surface of said lip defining a bearing surface for said roller cutter therein to permit a maximum legth of bearing area between said journal and said roller cutter.

11. A rotary drill bit as set forth in claim 10 wherein a floating bushing is provided between said journal and said roller cutter adjacent said large diameter bore portion.

12. A rotary drill bit as set forth in claim 6 wherein a separate sleeve is secured to said roller cutter and defines a lip forming a portion of said annular pocket.

13. A rotary drill bit as set forth in claim 6 wherein said lubricant passages are of a size of at least around 3/16 inch in diameter.

* * * * *